J. T. SMITH.
CALIPERS.
APPLICATION FILED MAY 9, 1917.

1,261,451.

Patented Apr. 2, 1918.

Inventor
J. T. Smith.

By [signature], Attorneys

UNITED STATES PATENT OFFICE.

JEROME T. SMITH, OF SCOTLAND, SOUTH DAKOTA, ASSIGNOR TO LOUIS F. NAFIS, OF CHICAGO, ILLINOIS.

CALIPERS.

1,261,451.  Specification of Letters Patent.  Patented Apr. 2, 1918.

Application filed May 9, 1917. Serial No. 167,558.

*To all whom it may concern:*

Be it known that I, JEROME T. SMITH, a citizen of the United States, residing at Scotland, in the county of Bonhomme and State of South Dakota, have invented certain new and useful Improvements in Calipers, of which the following is a specification.

This invention relates to measuring instruments and has as its object to provide calipers designed for use in connection with the necks of testing bottles in creameries, cream stations, sterilization plants, laboratories, etc. Ordinarily, the height of the cream column in the neck of the testing bottle is measured by the use of ordinary calipers or dividers, both legs of which instrument have sharply pointed ends but difficulty is experienced in taking measurements by the use of such an instrument as it is practically impossible to maintain the points of the legs in simultaneous contact with the neck of the testing bottle and prevent slipping of one or both points from the bottle while taking the measurement. The present invention, therefore, aims to provide calipers which may be readily and conveniently disposed against the neck of a testing bottle and the like, and which, when so disposed, will not be liable to slip from engagement with the said neck of the bottle and yet the measurements may be taken with the same degree of accuracy as with ordinary calipers.

Figure 1:
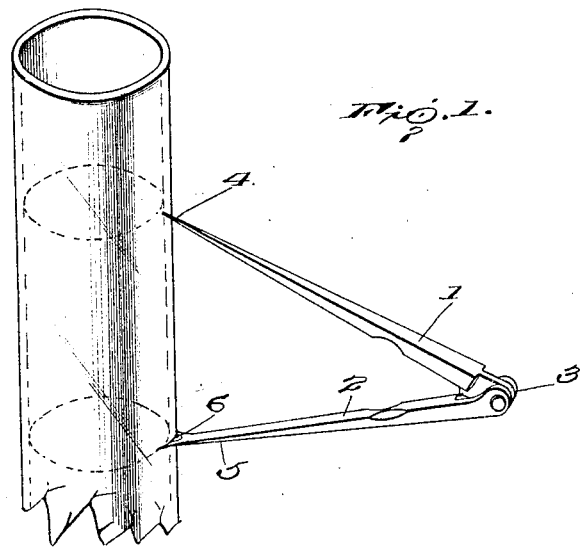
Figure 1 is a perspective view of the calipers embodying the present invention, the view illustrating the manner in which the instrument is to be employed.
Figure 2:
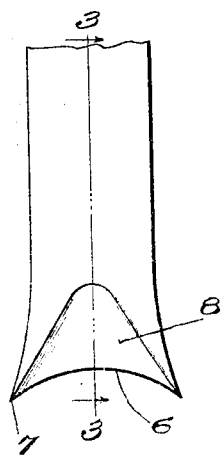
Fig. 2 is a view in elevation on an enlarged scale of the end of one of the legs of the calipers.
Figure 3:
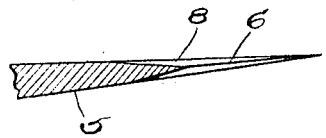
Fig. 3 is a vertical sectional view on the line 3—3 of Fig. 2.

The calipers embodying the present invention greatly resemble the ordinary calipers or dividers including a pair of legs, one indicated by the numeral 1 and the other by the numeral 2, which legs are connected by the usual pivot joint 3. As is usual, the ends of the leg 1 are sharply pointed, as indicated by the numeral 4, but the end of the leg 2 is formed in a different manner so as to prevent slipping of the instrument from engagement with the neck of a testing bottle or the like against which the ends of its legs have been disposed. As usual, the legs 1 and 2 have their opposing or mutually contacting faces flat throughout their entire length so that the ends of the legs may be brought together and measurement taken of very short distances, and the outer or opposite face of the leg 2 is beveled or gradually tapered, as indicated by the numeral 5, so that at its extremity the leg 2 is substantially flat and relatively thin. Instead, however, of terminating in a straight transverse edge, the said leg is notched, as indicated by the numeral 6, to form two spaced points 7 and both faces of the leg at the edge of the notch 6 are beveled, as indicated by the numeral 8, so that the wall of the notch 6 is rather sharp than blunt.

By reference now to Fig. 1 of the drawings it will be readily understood that when the ends of the legs of the calipers are disposed against the neck of a testing bottle the end of the leg 2 will engage the neck of the bottle at the two points 7 instead of at a single point, the presence of the notch 6 permitting this. Thus when the instrument has been so engaged there will be no likelihood of the leg 2 slipping from engagement and having been properly located the leg 1 may be adjusted so as to take the desired measurement. As the end of the leg 2 is beveled and the wall of the notch 6 is relatively sharp, measurements may be taken with the same degree of accuracy as if the end of this leg were provided, as in the case of the leg 1, with a single sharp point.

Having thus described the invention, what is claimed as new is:

Calipers having relatively movable legs, the engaging end of one leg having spaced engaging elements the opposing sides of which have relatively sharp edges and the engaging end of the other leg being positioned to follow a line passing between said elements in the adjustment of the legs, the space between the engaging elements of the first-mentioned leg being unobstructed.

In testimony whereof I affix my signature.

JEROME T. SMITH. [L. S.]

Copies of this patent may be obtained for five cents each, by addressing the "Commissioner of Patents, Washington, D. C."